United States Patent
Warkentin et al.

(10) Patent No.: US 11,803,445 B2
(45) Date of Patent: Oct. 31, 2023

(54) BOOT FAILURE PROTECTION ON SMARTNICS AND OTHER COMPUTING DEVICES

(71) Applicant: VMware, Inc., Palo Alto, CA (US)

(72) Inventors: Andrei Warkentin, South Elgin, IL (US); Jared McNeill, Quispamsis (CA); Sunil Kotian, San Jose, CA (US); Alexander Fainkichen, Southborough, MA (US); Shruthi Hiriyuru, Medford, MA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/577,714

(22) Filed: Jan. 18, 2022

(65) Prior Publication Data

US 2023/0229558 A1     Jul. 20, 2023

(51) Int. Cl.
G06F 11/14     (2006.01)
G06F 9/455     (2018.01)
G06F 11/07     (2006.01)

(52) U.S. Cl.
CPC ...... G06F 11/1417 (2013.01); G06F 9/45541 (2013.01); G06F 11/0757 (2013.01); G06F 11/1441 (2013.01); G06F 11/1484 (2013.01)

(58) Field of Classification Search
CPC ............ G06F 11/1417; G06F 9/45541; G06F 11/0757; G06F 11/1441; G06F 11/1484
See application file for complete search history.

(56) References Cited

U.S. PATENT DOCUMENTS

| | | | |
|---|---|---|---|
| 2014/0289570 A1* | 9/2014 | Lewis | G06F 11/3089 714/43 |
| 2017/0123884 A1* | 5/2017 | Lai | G06F 11/079 |
| 2019/0235983 A1* | 8/2019 | Campi | G06F 11/3055 |
| 2020/0012552 A1* | 1/2020 | Brown | G06F 9/4406 |
| 2020/0089571 A1* | 3/2020 | Narasimhan | G06F 11/1417 |
| 2022/0171648 A1* | 6/2022 | Rodriguez | G06F 9/5072 |
| 2022/0417257 A1* | 12/2022 | Behl | H04L 63/1416 |

* cited by examiner

*Primary Examiner* — Bryce P Bonzo
*Assistant Examiner* — Michael Xu
(74) *Attorney, Agent, or Firm* — Thomas Horstemeyer, LLP (57) ABSTRACT

Boot failure protection on smartNICs and other computing devices is described. During a power-on stage of a booting process for a computing device, a boot loading environment is directed to install an application programming interface (API) able to be invoked to control operation of a hardware-implemented watchdog. During an operating system loading stage of the booting process, the application programming interface is invoked to enable the hardware-implemented watchdog. During an operating system hand-off stage of the booting process, a last watchdog refresh of the hardware-implemented watchdog is performed, and execution of the boot loading environment is handed off to a kernel boot loader of an operating system. The application programming interface may not be accessible after the hand off to the kernel boot loader.

20 Claims, 4 Drawing Sheets

```
303 ┤ #define RUNTIME_WATCHDOG_PROTOCOL_GUID \
     { \
       0xfb7ef6e8, 0x822b, 0x47b7, {0x94, 0x70, 0x2f, 0xcc, 0x73, 0x58, 0xb2, 0xcf } \
     } typedef struct _RUNTIME_WATCHDOG_PROTOCOL RUNTIME_WATCHDOG_PROTOCOL;    ← 306

309 ┤ typedef enum {
         // BSA Generic Watchdog, detected using ACPI GTDT.
         ARM_GENERIC_WATCHDOG,
         // Vendor-specific WDT, detected using vendor-specific static ACPI table (not DSDT).
         VENDOR_WATCHDOG,
     } RUNTIME_WATCHDOG_TYPE;

/**
       Enables/disables/restarts the watchdog timer countdown. The armed timer survives
       ExitBootServices. If the timer expires before ExitBootServices, it gets
       automatically refreshed.

@param[in] This              The protocol instance
       @param[in] TimeoutSeconds    If non-zero and watchdog is disabled, enables
                                    watchdog with the timeout
312 ┤                              If non-zero and watchdog is enabled, restarts
                                    watchdog with new timeout
                                    If zero and watchdog disabled, does nothing
                                    If zero and watchdog enabled, disables watchdog @retval EFI_SUCCESS          Operation completed successfully
       @retval EFI_DEVICE_ERROR     The command was unsuccessful
       @retval EFI_NOT_SUPPORTED    Disabling or re-arming with a different timeout is
                                    unsupported
     **/
     typedef
     EFI_STATUS
     (EFIAPI *RUNTIME_WATCHDOG_SET) (
       IN struct _RUNTIME_WATCHDOG_PROTOCOL *This,
       IN UINTN TimeoutSeconds
       );

315 ┤ struct _RUNTIME_WATCHDOG_PROTOCOL {
         RUNTIME_WATCHDOG_TYPE Type;

// Used to help find the matching WDT where multiple WDTs are present.
         // For Type == ARM_GENERIC_WATCHDOG, this matches the GTDT WatchdogControlFrame
         // physical address.

EFI_PHYSICAL_ADDRESS Base;

// The Min/Max TimeoutSeconds provide guidance of the
         // supported range to be passed to SetWatchdog.

UINTN MinTimeoutSeconds;    // Must be >= 1
         UINTN MaxTimeoutSeconds;    // Must be >= MinTimeoutSeconds
         RUNTIME_WATCHDOG_SET SetWatchdog;
     };

extern EFI_GUID gRuntimeWatchdogProtocolGuid;
```

*FIG. 3*

FIG. 4

BOOT FAILURE PROTECTION ON SMARTNICS AND OTHER COMPUTING DEVICES

BACKGROUND

Data centers and other computing infrastructure employ various types of physical hardware, such as central processing units (CPUs), graphics processing units (GPUs), network interface cards (NICs), smart network interface cards (smartNICs), memory storage, data processing units (DPUs), and the like. Using the physical hardware, data centers offer up network services that can be accessed remotely by various computing devices. Some network services include computing resources that are virtualized by a hypervisor to offer a multitude of virtual machines (VMs) that serve up virtualized computing software and hardware, for example.

In some scenarios, it is beneficial to operate a bare-metal hypervisor that is installed directly onto a physical host without intermediary software. The bare-metal hypervisor provides increased access to and control of underlying hardware resources. As such, the bare-metal hypervisor partitions hardware to consolidate applications and increase efficiency of operation of various computing resources. However, bare-metal hypervisors have various vulnerabilities, such as dealing with potentially fatal errors occurring during boot loading operations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is pseudocode illustrating an example of an application programming interface for controlling an underlying hardware-implemented watchdog during a booting process.

DETAILED DESCRIPTION

The present disclosure relates to boot failure protection on smartNICs and other computing devices. Bare-metal hypervisors are now being deployed and optimized for execution on smartNICs and similar types of computing devices. smartNICs may include Arm® microservers, other microservers, and/or other similar computing devices that perform boot operations similar to traditional servers. These boot operations are often performed with unified extensible firmware interface (UEFI) and secure boot systems.

While bare-metal hypervisor may be launched while performing secure boot checks, a gap in protection exists between firmware hand-off and enough of an operating system initializing such that a defect or fault can be recognized and properly handled (e.g., through controlled error handling and crashing). Notably, when a boot loader (e.g., a UEFI boot loader) receives a notification from an operating system indicating the operating system will take over boot loading operations, existing specifications require the boot loader disable a hardware watchdog. As such, in this gap of protection, any failure is usually silent, leading to compromised fault error reporting and recovery.

While some smartNICs and like computing devices have hardware watchdog mechanisms that can be useful, the wide variety in their implementation poses a challenge for generic support in early boot software. It also makes it difficult to have a single bare-metal hypervisor image that can be deployed on disparate types of smartNICs and other like computing devices. In other words, it is not desirable to have to create different images of a bare-metal hypervisor to be deployed on respective ones of disparate types of computing devices.

Accordingly, a system for boot failure protection is described. A computing device (e.g., a smartNIC) may be configured to, during a power-on stage of a booting process for the at least one computing device, direct a boot loading environment to install an application programming interface (API) able to be invoked to control operation of the hardware-implemented watchdog. Thereafter, during an operating system loading stage of the booting process, the computing device may invoke the application programming interface to enable the hardware-implemented watchdog. During an operating system hand-off stage of the booting process, a last watchdog refresh of the hardware-implemented watchdog may be performed, and execution of the boot loading environment handed off (or assigned to) to a kernel boot loader of an operating system. In some implementations, the application programming interface is not accessible after the hand off to the kernel boot loader. The booting process may include a process in which operating system components are loaded into random-access memory (RAM), as may be appreciated.

The application programming interface referred to herein may be called or otherwise invoked to perform one or more of enabling the hardware-implemented watchdog; disabling the hardware-implemented watchdog; accessing a type of the hardware-implemented watchdog; accessing a physical memory address for the hardware-implemented watchdog; identifying a minimum countdown period in which the hardware-implemented watchdog is capable of being configured; and identifying a maximum countdown period in which the hardware-implemented watchdog is capable of being configured.

The hardware-implemented watchdog may include a physical circuit configured in hardware to send a reset signal when a first predetermined amount of time elapses without receipt of a first refresh signal. The reset signal may direct the computing device to enter into a safe mode or perform a device reset. The hardware-implemented watchdog may be initialized using a second predetermined amount of time, the second predetermined amount of time being greater than the first predetermined amount of time.

In some embodiments, the boot loading environment is a Unified Extensible Firmware Interface (UEFI) boot loading environment. As such, the application programming interface may be installed by storing a driver in a directory that directs the UEFI boot loading environment to install the driver during the power-on stage of the booting of the at least one computing device.

In various embodiments, the application programming interface may be standard in an image of a bare-metal hypervisor and, in other words, does not vary among types of smartNICs (or other computing devices) on which the boot loading environment is installed. To this end, the application programming interface may include a first portion code configured to control operation of the hardware-implemented watchdog based on a type of the at least one computing device (e.g., a smartNIC having a model number manufactured by GammaCo). The application programming interface may further include a second portion code configured to control operation of another hardware-implemented watchdog based on other types of computing devices (e.g., a smartNIC or a DPU manufactured by DeltaCo). To this end, the first portion of code and the second portion of code are included in a single image of a bare-metal hypervisor or an operating system executable on the at least one computing device.

In various embodiments, the computing device is further directed to execute a first stage boot loader, the first stage boot loader being a UEFI applicable executed in the UEFI boot loading environment. The first stage boot loader invokes the application programming interface to enable the hardware-implemented watchdog, and hands off execution to a second stage boot loader in some examples.

Through use of an application programming interface during a booting process in which a hardware-implemented watchdog is utilized, computing resources are saved. Notably, purely software-implemented watchdogs utilize resources of the CPU, which monopolizes resources critical for other tasks, especially boot loading tasks. To this end, modifying the behavior of and utilizing an underlying hardware-implemented watchdog allows CPU resources to be saved and devoted to critical tasks, thereby increasing the performance of the computing device.

Figure 1:
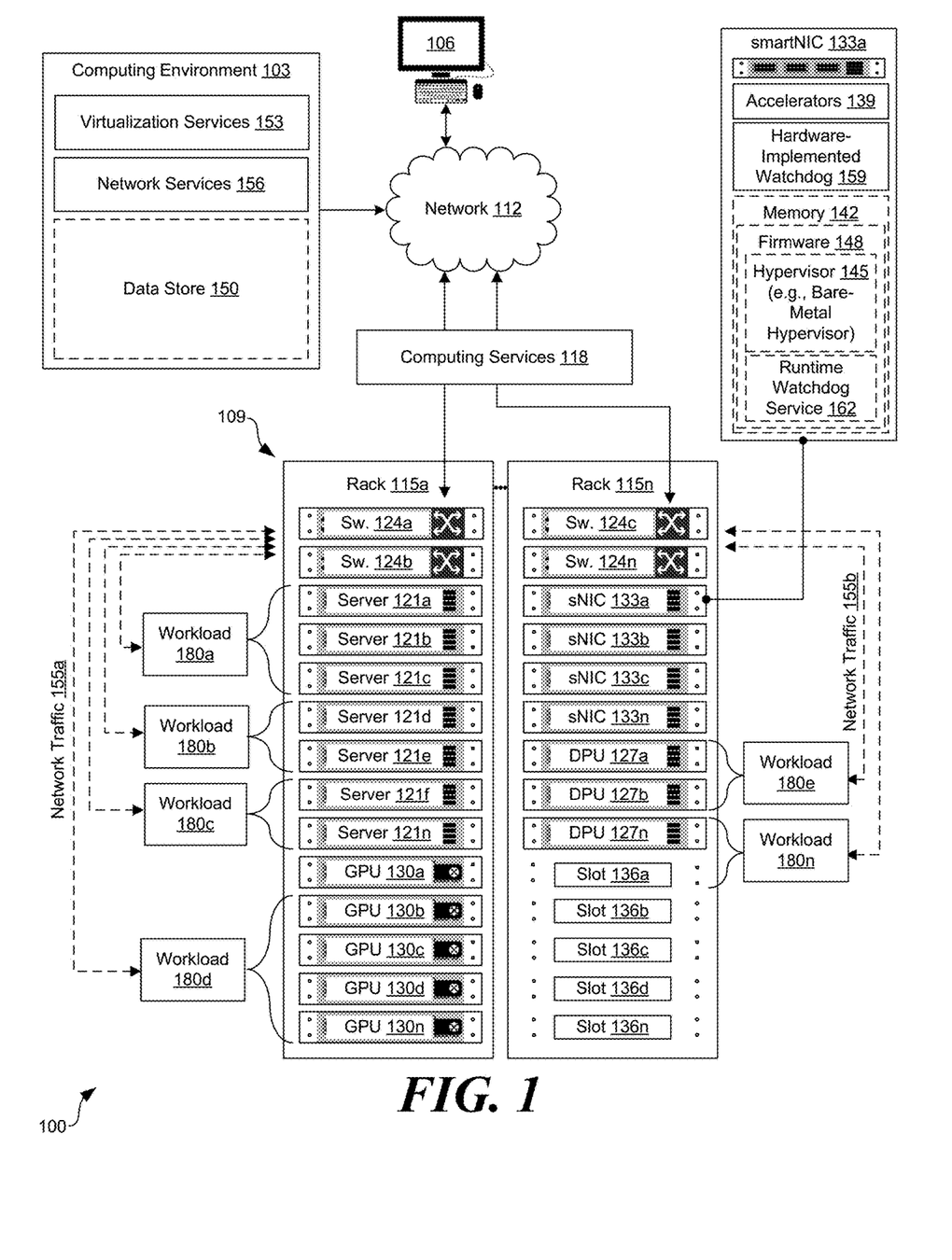
FIG. 1 is a drawing of an example of a networked computing environment for boot failure protection on smartNICs and other computing devices.

Turning now to FIG. 1, an example of a networked environment 100 is shown. The networked environment 100 may include a computing environment 103, client devices 106, and various computing systems 109 in communication with one other over a network 112. The network 112 may include, for example, the Internet, intranets, extranets, wide area networks (WANs), local area networks (LANs), wired networks, wireless networks, other suitable networks, or any combination of two or more such networks.

The network 112 of the networked environment 100 may include satellite networks, cable networks, Ethernet networks, telephony networks, and other types of networks. The computing systems 109 may include devices installed in racks 115a . . . 115n (collectively "racks 115"), which can make up a server bank, aggregate computing system, or a computer bank in a data center or other like facility. In some examples, the computing systems 109 may include high-availability computing systems, which includes a group of computing devices that acts as a single system and provides a continuous uptime. The devices in the computing systems 109 may include any number of physical machines, virtual machines, virtual appliances, and software associated therewith, such as operating systems, drivers, hypervisors, scripts, and applications.

The computing systems 109, and the various hardware and software components contained therein, may include infrastructure of the networked environment 100 that provide one or more computing services 118. Computing services 118 may include network-based application programming interface (API) services that can be invoked through a network-based API call, for example.

The computing environment 103 may include an enterprise computing environment that includes hundreds or even thousands of physical machines, virtual machines, and other software implemented in devices stored in racks 115, distributed geographically, and connected to one another through the network 112. As such, the computing environment 103 can be referred to as a distributed computing environment in some examples. It is understood that any virtual machine or virtual appliance is implemented using at least one physical device, such as a server or other computing device.

The devices in the racks 115 may include various physical computing resources. The physical computing resources may include, for example, physical computing hardware, such as memory and storage devices, servers 121a . . . 121n (collectively "servers 121"), switches 124a . . . 124n, DPUs 127a . . . 127n, GPUs 130a . . . 130n, smartNICs 133a . . . 133n (collectively "smartNICs 133"), central processing units (CPUs), power supplies, and so forth. The devices, such as servers 121, switches 124, DPUs 127, GPUs 130, smartNICs 133, and the like, can have dimensions suitable for quick installation in slots 136a . . . 136n (collectively "slots 136") on the racks 115.

In various examples, the servers 121 may include physical hardware and software to create and manage virtualization infrastructure, a cloud computing environment, an on-premise environment, and/or a serverless computing environment. Also, in some examples, the physical computing resources may be used to provide virtual computing resources, such as virtual machines or other software, as a computing service 118. In various examples, the virtual machines may serve up virtual desktops or other virtualized computing infrastructure.

Each server 121, DPU 127, smartNIC 133, and the like may act as a host in the networked environment 100 and, thereby, may include one or more virtual machines (VMs) executing thereon. Referring to representative smartNIC 133, the smartNICs 133 may include accelerators 139 that offload tasks from CPUs of the servers 121, such as those that manage distributed and virtualization applications. The accelerators 139 may perform networking tasks more efficiently than CPUs of the servers 121. In some implementations, the smartNICs 133 include CPUs and memory 142 such that the operation of the accelerators 139 is configurable by developers and/or administrators (e.g., through programming). Accordingly, smartNICs 133 are often individually referred to as a system-on-a-chip (SoC).

In some examples, a hypervisor 145 can be installed on one or more of the smartNICs 133, servers 121, and the like to support a virtual machine execution space within which one or more virtual machines can be concurrently instantiated and executed. The hypervisor 145 may include the ESX™ hypervisor by VMware®, the ESXi™ hypervisor by VMware®, the ESXio™ hypervisor by VMware®, or similar hypervisor 145 in some examples.

In further examples, the hypervisor 145 is a bare-metal hypervisor. The bare-metal hypervisor 145 may include a hypervisor installed directly on hardware of a physical machine, such as a smartNIC 133 and/or server 121, for instance, between the hardware and the operating system. To this end, in some examples, the bare-metal hypervisor 145 may be embedded into firmware 148 of the smartNIC 133 and/or server 121, for instance, at the same level as a motherboard basic input/output system (BIOS) or a unified extensible firmware interface (UEFI) system. A bare-metal hypervisor 145 may assist some systems to enable the operating system on a computer to access and use virtualization software. To this end, the firmware 148 may include ARM® firmware or similar firmware 148.

It is understood that the computing systems 109 can be scalable, meaning that the computing systems 109 in the networked environment 100 can increase or decrease dynamically to include or remove servers 121, switches 124, DPUs 127, GPUs 130, smartNICs 133, power sources, and other components without downtime or otherwise impairing performance of the computing services 118 offered up by the computing systems 109.

Referring now to the computing environment 103, the computing environment 103 may include, for example, a server 121 or any other system providing computing capability. Alternatively, the computing environment 103 may include one or more computing devices that are arranged, for example, in one or more server banks, computer banks, computing clusters, or other arrangements. The computing environment 103 may include a grid computing resource or any other distributed computing arrangement. The computing devices can be located in a single installation or can be distributed among many different geographical locations. The computing environment 103 may include or be operated as one or more virtualized computer instances in some examples. Although shown separately from the computing systems 109, it is understood that in some examples the computing environment 103 can be included as all of or a part of the computing systems 109.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 109 and client devices 106 over the network 112, sometimes remotely, the computing environment 103 can be described as a remote computing environment 103 in some examples. Additionally, in various examples, the computing environment 103 can be implemented in servers 121 of a rack 115, and can manage operations of a virtualized or cloud computing environment through interaction with the computing services 118.

The computing environment 103 may include a data store 150, which may include one or more databases in some examples. The data store 150 may include memory of the computing environment 103, mass storage resources of the computing environment 103, or any other storage resources on which data can be stored by the computing environment 103. The data store 150 may include memory of the servers 121 in some examples. The data store 150 may include one or more relational databases, such as structured query language databases, non-SQL databases, or other relational or non-relational databases. The data stored in the data store 150, for example, can be associated with the operation of the various services or functional entities described below. The components executed on the computing environment 103 may include, for example, virtualization service 153, network services 156, as well as other applications, services, processes, systems, engines, or functionality not discussed in detail herein.

Ultimately, the various physical and virtual components of the computing systems 109 can process workloads 180a . . . 180n. Workloads 180 can refer to the amount of processing that a server 121, switch 124, DPU 127, GPU 130, smartNIC 133, or other physical or virtual component has been instructed to process or route at a given time. The workloads 180 can be associated with virtual machines, public cloud services, private cloud services, hybrid cloud services, virtualization services, device management services, containers, or other software executing on the servers 121 (and thus, in the computing environment 103).

Referring back to representative smartNIC 133a, the smartNIC 133a (or other computing device) may include a hardware-implemented watchdog 159. The hardware-implemented watchdog 159 may include a watchdog that is configured in a physical circuit, an application-specific integrated circuit (ASIC), or computing system to send a reset signal when a predetermined amount of time elapses without receipt of a refresh signal. For instance, a timer will increment downwards until a predetermined amount of time has expired. If a refresh signal is not received before expiration of the predetermined amount of time, the hardware-implemented watchdog 159 sends the reset signal. The reset signal may direct the device to enter into a safe mode of operation, perform a system reset, recycle or reboot the device, or similar operation, as may be appreciated. The hardware-implemented watchdog 159 may be contrasted with a software-implemented watchdog that requires software to refresh and/or send reset signals, as may be appreciated, which requires use of the CPU.

The firmware 148 may further include a runtime watchdog service 162. It may be desirable to have a single image of a hypervisor 145 (e.g., a bare-metal hypervisor 145) that can be installed and operate on a device regardless of a type, model, manufacturer, specifications, etc., of the device. For instance, a same image of the hypervisor 145 that can execute as intended on a certain model of smartNIC 133 manufactured by GammaCo may also be used to execute as intended on a varying model of smartNIC 133 manufactured by BetaCo. It is understood that these smartNICs may have varying models, manufacturers, specifications, and so forth. Also, the hardware-implemented watchdogs 159 may operate differently on different types of devices.

Further, for performing boot operations in association with a bare-metal hypervisor 145, it may be desirable that the hardware-implemented watchdog 159 is capable of handling long periods without sending reset signals. In other words, it is not desirable for the hardware-implemented watchdog 159 to send reset signals while the bare-metal hypervisor 145 is being booted or otherwise brought online. As such, it can be desirable to have a hardware-implemented watchdog 159 that is capable of idling for a predetermined amount of time (e.g., approximately five minutes as but one example) without sending a reset signal. For example, ARM® Base System Architecture (BSA) compliant watchdogs have a 48-bit watchdog offset register (WOR), which is sufficient for allowing the hardware-implemented watchdog 159 to idle for approximately five minutes, depending on the frequency of the clock signal feeding the watchdog timer. It is further desirable that the hardware-implemented watchdog 159 be capable of performing a "bite" operation that causes a system reset.

If the hardware-implemented watchdog 159 is not capable of idling for the predetermined time and/or performing the bite operation, then functionality of a suitable watchdog may be paravirtualized. In other words, the device (e.g., smartNIC 133 or server 121) may be configured to handle greater idling times and perform other operations as needed to boot a bare-metal hypervisor 145. The paravirtualization of the hardware-implemented watchdog 159 may include the firmware 148 having a runtime watchdog service 162 stored therein.

In some embodiments, the runtime watchdog service 162 may use the same units as a generic timer (e.g., driven by CNTFRQ_EL0) and may have the same constraints as the BSA generic watchdog. While implementations leveraging only the secure timer is possible, other implementations include using and refreshing the hardware-implemented watchdog 159 to avoid system resets during a boot of a bare-metal hypervisor 145, for example. Through operations of the runtime watchdog service 162, the device will be able to recover from situations where all processing cores are jammed with processing tasks, and exceptions are unable to be handled.

Figure 2:
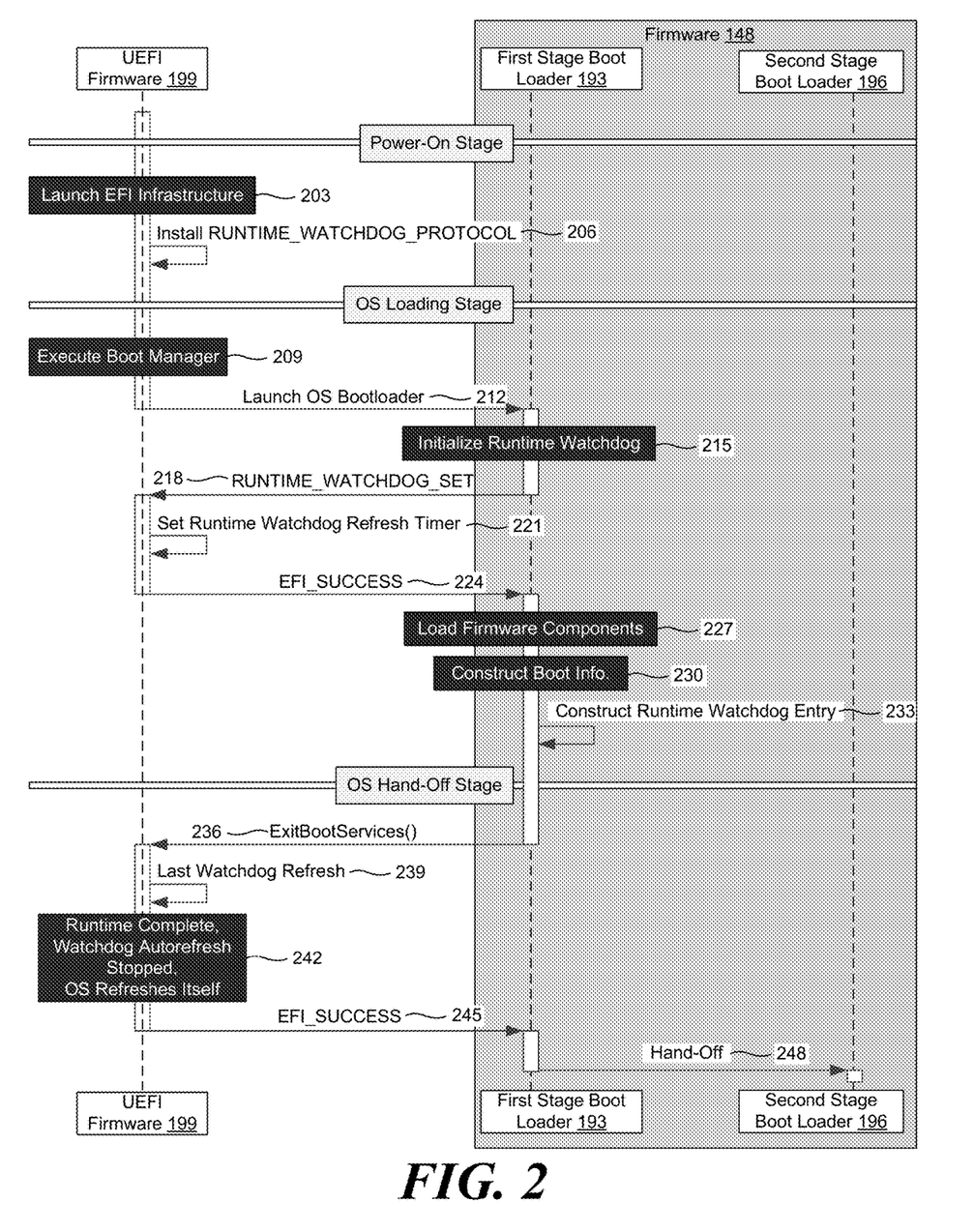
FIG. 2 is a sequence diagram illustrating a boot operation in which an application programming interface is employed to control operation of an underlying hardware-implemented watchdog.

Referring now to FIG. 2, a non-limiting example of a sequence diagram is shown according to various embodiments. The various stages of the sequence diagram may be performed during a booting process, which may include a process in which operating system components are loaded into random-access memory or other desired memory. Initially, a smartNIC 133 or other device may include firmware 148 having UEFI or BIOS firmware that oversees boot operations. As such, the sequence diagram may be performed in a boot loading environment, such as a UEFI boot loading environment, by applications executing in the boot loading environment.

While shown separate from the firmware 148, it is understood that the UEFI and other portions of the sequence diagram may be performed by a respective part of the firmware 148. The firmware 148 may include or further include a first stage boot loader 193 (e.g., a hypervisor boot loader) for booting a hypervisor 145, for example, as well as a second stage boot loader 196 for booting an operating system. To this end, the hypervisor 145 may include a bare-metal hypervisor 145 in some examples. The first stage boot loader 193 and the second stage boot loader 196 can include applications executing in the UEFI boot loading environment.

First, at box 203, during a power-on stage (e.g., a stage immediately following a physical powering on of a device, such as a smartNIC 133 or a server 121), the UEFI firmware 199 on the device may launch EFI Infrastructure (e.g., executing software) that permits EFI-compliant executables to be executed. The EFI infrastructure may permit applications, such as the first stage boot loader 193 and the second stage boot loader 196, to execute. This interface, RUNTIME_WATCHDOG_PROTOCOL, provides an easy way to not only query available facilities and/or specifications of any hardware-implemented watchdogs 159 on a device, but also to activate a hardware-implemented watchdog 159 in the first stage boot loader 193 and leave the hardware-implemented watchdog 159 armed after ExitBootServices( ) is invoked (e.g., UEFI to operating system hand-off). Additionally, the application programming interface may not just be used to activate the hardware-implemented watchdog 159, but also handle any required periodic updates of the hardware-implemented watchdog 159, removing such engineering requirements from the first stage boot loader 193.

At box 206, the UEFI system may install a runtime watchdog protocol during the power-on stage, for example. The runtime watchdog protocol may include an application programming interface that can be invoked to initialize a runtime watchdog service that oversees the hardware-implemented watchdog 159, as will be described. In some embodiments, the runtime watchdog protocol (e.g., the application programming interface) is installed by storing a driver in a directory that directs the UEFI boot loading environment to install the driver during the power-on stage of the booting process.

The runtime watchdog protocol may include an application programming interface in which an API call causes at least one of the following to be performed: enable the hardware-implemented watchdog 159; disable the hardware-implemented watchdog 159; enable or disable programmatic atomic refresh of the hardware-implemented watchdog 159; access a type of the hardware-implemented watchdog 159; access a physical memory address for the hardware-implemented watchdog 159; identify a minimum countdown period in which the hardware-implemented watchdog 159 is capable of being configured; and identify a maximum countdown period in which the hardware-implemented watchdog 159 is capable of being configured.

Thereafter, the process proceeds to the operating system loading stage. There, at box 209, the UEFI system may execute a boot manager configured to handle and oversee the booting process. At box 212, the boot manager launches an operating system boot loader, which includes executable code that initializes and launches an operating system. At box 215, the first stage boot loader 193 may initialize the runtime watchdog service 162. Initializing the runtime watchdog service 162 may include invoking a runtime watchdog protocol function using input parameters. Additionally, initializing the runtime watchdog service 162 may include enabling the hardware-implemented watchdog 159.

Thereafter, at boxes 218 and 221, the first stage boot loader 193 may set a runtime watchdog refresh timer, for instance, by invoking a RUNTIME_WATCHDOG_SET function of the runtime watchdog protocol ("RUNTIME_WATCHDOG_PROTOCOL"). The UEFI system, at box 224, may respond by returning a success signal ("EFI_SUCCESS") to the first stage boot loader 193, for instance, if the watchdog refresh timer is successfully set on the hardware-implemented watchdog 159.

At box 227, the first stage boot loader 193 may load bare-metal hypervisor 145 components used to execute the bare-metal hypervisor 145 (or other desired component, such as an operating system). In other words, the first stage boot loader 193 may load or store operating system components in random-access memory or other memory. At box 230, the first stage boot loader 193 may construct boot information data, which may include a table, data object, or other collection of data. At box 233, the first stage boot loader 193 may construct a runtime watchdog entry for a table, database, or other suitable memory location, describing the watchdog identified by the RUNTIME_WATCHDOG_PROTOCOL to later stages of operating system initialization.

Thereafter, the process proceeds to the operating system hand-off stage. At box 236, the ExitBootServices( ) function is invoked after a predetermined set of boot operations have completed. Next, at box 239, the UEFI firmware 199 (e.g., at the direction of the first stage boot loader 193) may perform a last watchdog refresh to prevent the hardware-implemented watchdog 159 from lapsing during a hand-off from the UEFI system to the operating system. At box 242, the runtime of the UEFI system is complete, and the UEFI system will no longer refresh the watchdog. As such, at box 245, the UEFI system will send an EFI success signal to the first stage boot loader 193, who then hands-off operation of the hardware-implemented watchdog 159 to a kernel of the operating system at box 248. Thereafter, the process can proceed to completion.

Notably, a UEFI (or similar) protocol is described for arming the hardware-implemented watchdog 159. In some embodiments, by default, the hardware-implemented watchdog 159 is not enabled and will be activated by the UEFI firmware 199. When activated, the UEFI firmware 199 may be responsible for refreshing the hardware-implemented watchdog 159 until ExitBootServices( ) is invoked (e.g., where UEFI is handed off to the operating system). In instances in which hardware allows, the hardware-implemented watchdog 159 may be deactivated by the UEFI firmware 199 if booting aborts and execution is passed back to the UEFI boot device selection (BDS).

In various embodiments, when on ExitBootServices( ) is invoked, the hardware-implemented watchdog 159 may be left armed. The UEFI firmware 199 may perform one last watchdog refresh to ensure that the operating system is not handed control at the tail end of the refresh period. In various embodiments, the operating system may then become responsible for refreshing. In an event, the operating system halts or crashes, the operating system may be responsible for refreshing the watchdog, if necessary, to avoid a hard reset (e.g., a physical repowering of the device). A boot loader (e.g., a bare-metal hypervisor boot loader) may use RUNTIME_WATCHDOG_SET to set a watchdog period long enough to cover a boot of a bare-metal hypervisor 145 or other software (e.g., 5 minutes). In other embodiments, a boot loader may instead opt for a short period, relying on the bare-metal hypervisor 145 or other software to perform the necessary periodic refreshes even as part of its early initialization.

Referring now to FIG. 3, pseudocode is shown that provides one example of the operation of a portion of the networked environment 100. The flowchart of FIG. 3 can be viewed as depicting an example of elements of a method implemented by the runtime watchdog service 162 and/or other firmware 148 executing in the smartNIC 133 or other computing device according to one or more examples. The separation or segmentation of functionality as discussed herein is presented for illustrative purposes only.

Code segment 303 may define a physical memory address of a hardware-implemented watchdog 159 is some examples. Code segment 306 may define a data structure, referred to as "RUNTIME_WATCHDOG_PROTOCOL." A typedef is a mechanism for declaring an alternative name for a type of variable or data structure. Code segment 309 may detect a BSA generic watchdog that may be detected, for example, using an advanced configuration and power interface (ACPI) generic timer description table (GTDI). Code segment 309 may further identify a vendor- or manufacturer-specific watchdog timer (WDT). In some embodiments, the vendor- or manufacturer-specific watchdog timer may be detected using a vendor- or manufacturer-specific static ACPI table.

Accordingly, in some implementations, the application programming interface ("RUNTIME_WATCHDOG_PROTOCOL") may include a first portion code configured to control operation of the hardware-implemented watchdog based on a type of the at least one computing device, as well as a second portion code configured to control operation of another hardware-implemented watchdog based on other types of computing devices. However, the first portion of code and the second portion of code may be included in a single image of a bare-metal hypervisor 145.

Code segment 312 may define inputs for the runtime watchdog protocol which provides the ability to enable, disable, and/or restart a watchdog timer countdown. In some implementations, the armed timer survives ExitBootServices( ), described above with respect to FIG. 2. If the timer expires before ExitBootServices( ), it may be automatically refreshed.

Code segment 315 may be employed to find a matching watchdog timer where multiple watchdog timers are present. For Type=ARM_GENERIC_WATCHDOG, the value may match the GTDT WatchdogControlFrame physical address. Code segment 315 further includes a minimum and maximum time to provide guidance of the supported ranges to be passed to the SetWatchdog( ) function.

Figure 4:
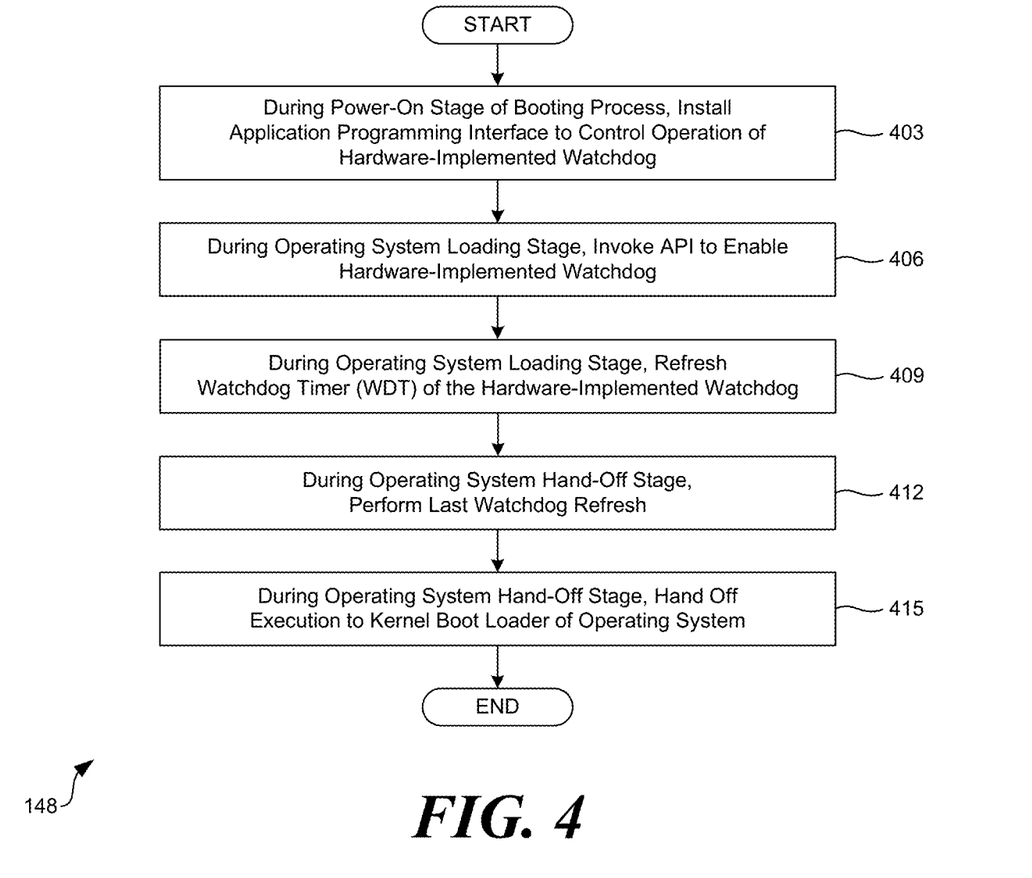
FIG. 4 is a flowchart illustrating functionality implemented by components of a smartNIC or other computing device of the networked environment of FIG. 1.

Moving on to FIG. 4, a flowchart is shown that provides one example of the operation of a portion of the networked environment 100. The flowchart of FIG. 4 can be viewed as depicting an example of elements of a method implemented by the UEFI firmware 199, the first stage boot loader 193, and/or other firmware 148 executing in the smartNIC 133 or other computing device according to one or more examples. The separation or segmentation of functionality as discussed herein is presented for illustrative purposes only.

According to various embodiments, an UEFI application programming interface or, more specifically, a UEFI protocol in UEFI parlance, is described to be implemented by the firmware 148 of a smartNIC 133 or other computing device. The application programming interface, RUNTIME_WATCHDOG_PROTOCOL, may provide a way to not only query available facilities and specifications of a hardware-implemented watchdog 159, but also to activate the facilitates in the first stage boot loader 193 and leave the hardware-implemented watchdog 159 armed after ExitBootServices( ) is invoked (e.g., UEFI to operating system hand-off). The application programming interface may be invoked to not only enable the hardware-implemented watchdog 159, but to handle required periodic watchdog updates, removing such engineering requirements from the first stage boot loader 193.

In some embodiments, the application programming interface may be specific to a type of bare-metal hypervisor 145. Further, in some implementations, the hardware-implemented watchdog 159 is not enabled by default. Instead, the hardware-implemented watchdog 159 is activated by the UEFI firmware 199. When activated, the UEFI firmware 199 may be responsible for refreshing until ExitBootServices( ) is invoked. When hardware allows, the hardware-implemented watchdog 159 may be deactivated by the UEFI firmware 199, for instance, if booting aborts and execution is passed back to the UEFI BDS.

In various implementations, when ExitBootServices( ) is invoked, the hardware-implemented watchdog 159 may be left armed. The UEFI firmware 199 may perform a last watchdog refresh, thereby ensuring that the operating system it not handed control at a tail end of a refresh period of the hardware-implemented watchdog 159. The operating system may then be responsible for refreshing the watchdog timer. Upon a halt or a crash, the operating system may be responsible for refreshing the watchdog, if necessary, to avoid a hard reset.

Beginning with box 403, the UEFI firmware 199 may, during a power-on stage of a booting process, install an application programming interface (e.g., RUNTIME_WATCHDOG_PROTOCOL) configured to control operation of a hardware-implemented watchdog 159. The application programming interface may be called or otherwise invoked to perform one or more of enabling the hardware-implemented watchdog; disabling the hardware-implemented watchdog; accessing a type of the hardware-implemented watchdog; accessing a physical memory address for the hardware-implemented watchdog; identifying a minimum countdown period in which the hardware-implemented watchdog is capable of being configured; and identifying a maximum countdown period in which the hardware-implemented watchdog is capable of being configured. In some embodiments, the install the application programming interface, a driver may be stored in a directory that directs a UEFI boot loading environment (e.g., the UEFI firmware 199) to install the driver during the power-on stage.

It is understood that, in some implementations, by default, the hardware-implemented watchdog 159 may be disabled. To this end, at box 406, the UEFI firmware 199 may, during an operating system loading stage, call or otherwise invoke the application programming interface to enable the hardware-implemented watchdog 159.

When activated, the UEFI firmware 199 may be responsible for refreshing a watchdog timer of the hardware-implemented watchdog 159 until execution of a first stage boot loader 193 is complete or until an ExitBootServices( ) routine is called or otherwise invoked. As such, at box 409, the UEFI firmware 199 may refresh the watchdog timer of the hardware-implemented watchdog 159.

In some implementations, the watchdog timer may be an actual timer of the hardware-implemented watchdog 159 or a virtual timer. To this end, a virtual timer may have time capabilities exceeding the time capabilities of the default watchdog timer. Accordingly, while the hardware-implemented watchdog 159 is configured to send a reset signal when a first predetermined amount of time elapses without receipt of a first refresh signal, in some implementations, the hardware-implemented watchdog is initialized using a second predetermined amount of time, the second predetermined amount of time being greater than the first predetermined amount of time. The reset signal may direct a smartNIC or other computing device to enter into a safe mode or perform a device reset.

Next, at box 412, the UEFI firmware 199 may, during the operating system hand-off stage, perform a last refresh of the watchdog timer of the hardware-implemented watchdog 159. The last refresh may ensure that the operating system it not handed control at a tail end of a refresh period of the hardware-implemented watchdog 159.

At box 415, the UEFI firmware 199 may, during the operating system hand-off stage, hand off (or transfer) execution to the second stage boot loader 196, which may include a kernel boot loader of an operating system in various examples. The operating system may then be responsible for refreshing the watchdog timer. Upon a halt or a crash, the operating system may be responsible for refreshing the watchdog, if necessary, to avoid a hard reset. Thereafter, the process may proceed to completion.

Various operations described in FIG. 4 may be performed by a computing device through execution of program instructions. The program instructions may be a portion of firmware 148 stored in non-volatile memory, such as memory 142 of a smartNIC or other 133 computing device.

Stored in the memory device are both data and several components that are executable by the processor. Also stored in the memory can be a data store 150, firmware 148, and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, RAM, ROM, hard drive, solid-state drive, USB flash drive, memory card, optical disc such as compact disc (CD) or digital versatile disc (DVD), floppy disk, magnetic tape, or other memory components.

Memory may include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface may include additional systems designed to coordinate this communication, including, for example, performing load balancing. The processor can be electric or of some other available construction.

Client devices 106 may be used to access user interfaces generated to configure or otherwise interact with the computing environment 103. These client devices 106 may include a display upon which a user interface generated by a client application for providing a virtual desktop session (or other session) can be rendered. In some examples, the user interface can be generated using user interface data provided by the computing environment 103. The client device 106 can also include one or more input/output devices that may include, for example, a capacitive touchscreen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies may include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that may include program instructions to implement the specified logical function(s). The program instructions can be embodied in the form of source code that may include human-readable statements written in a programming language or machine code that may include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic may include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium may include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for boot failure protection, comprising:
at least one computing device comprising a hardware-implemented watchdog and at least one hardware processor; and
program instructions stored in memory and executable by the at least one computing device that, when executed by the at least one hardware processor, direct the at least one computing device to:
during a power-on stage of a booting process for the at least one computing device, direct a boot loading environment to install an application programming interface (API) able to be invoked to control operation of the hardware-implemented watchdog, wherein the API comprises a first portion code configured to control operation of the hardware-implemented watchdog based on a type of the at least one computing device, a second portion code configured to control operation of another hardware-implemented watchdog based on other types of computing devices, and the first portion of code and the second portion of code are included in a single image of a bare-metal hypervisor executable on the at least one computing device;
during an operating system loading stage of the booting process, invoke the application programming interface to enable the hardware-implemented watchdog; and
during an operating system hand-off stage of the booting process, perform a last watchdog refresh of the hardware-implemented watchdog and hand off execution of the boot loading environment to a kernel boot loader of an operating system, wherein the application programming interface is not accessible after the hand off to the kernel boot loader.

2. The system of claim 1, wherein the at least one computing device is further directed to:
invoke the application programming interface through an application programming interface call to perform at least one of: enable the hardware-implemented watchdog; disable the hardware-implemented watchdog; access a type of the hardware-implemented watchdog; access a physical memory address for the hardware-implemented watchdog; identify a minimum countdown period in which the hardware-implemented watchdog is capable of being configured; and identify a maximum countdown period in which the hardware-implemented watchdog is capable of being configured.

3. The system of claim 1, wherein:
the booting process comprises loading operating system components into random-access memory (RAM) of the at least one computing device;
the boot loading environment is a Unified Extensible Firmware Interface (UEFI) boot loading environment; and
the application programming interface is installed by storing a driver in a directory that directs the UEFI boot loading environment to install the driver during the power-on stage of the booting of the at least one computing device.

4. The system of claim 1, wherein the boot loading environment is a Unified Extensible Firmware Interface (UEFI) boot loading environment.

5. The system of claim 1, wherein the at least one computing device is further directed to execute a first stage boot loader, the first stage boot loader being a UEFI applicable executed in the UEFI boot loading environment; and
wherein the first stage boot loader invokes the application programming interface to enable the hardware-implemented watchdog.

6. The system of claim 1, wherein:
the at least one computing device is at least one smart network interface card (smartNIC); and
the program instructions are at least a portion of firmware of the at least one computing device stored in non-volatile memory.

7. The system of claim 1, wherein:
the hardware-implemented watchdog is configured to send a reset signal when a first predetermined amount of time elapses without receipt of a first refresh signal;
the reset signal directs the at least one computing device to enter into a safe mode or perform a device reset; and
the hardware-implemented watchdog is initialized using a second predetermined amount of time, the second predetermined amount of time being greater than the first predetermined amount of time.

8. A computer-implemented method for boot failure protection, comprising:
during a power-on stage of a booting process for at least one computing device, installing, by a boot loading environment, an application programming interface (API) able to be invoked to control operation of a hardware-implemented watchdog of the at least one computing device, wherein the API comprises a first portion code configured to control operation of the hardware-implemented watchdog based on a type of the at least one computing device, a second portion code configured to control operation of another hardware-implemented watchdog based on other types of computing devices, and the first portion of code and the second portion of code are included in a single image of a bare-metal hypervisor executable on the at least one computing device;

during an operating system loading stage of the booting process, invoking, by a first stage boot loader, the application programming interface to enable the hardware-implemented watchdog; and during an operating system hand-off stage of the booting process, performing, by the boot loading environment, a last watchdog refresh of the hardware-implemented watchdog and hand off execution of the boot loading environment to a kernel boot loader of an operating system, wherein the application programming interface is not accessible after the hand off to the kernel boot loader.

9. The computer-implemented method of claim 8, further comprising performing at least one of:

invoking the application programming interface through an application programming interface call to perform at least one of: enable the hardware-implemented watchdog; disabling the hardware-implemented watchdog; access a type of the hardware-implemented watchdog; accessing a physical memory address for the hardware-implemented watchdog; identifying a minimum countdown period in which the hardware-implemented watchdog is capable of being configured; and identifying a maximum countdown period in which the hardware-implemented watchdog is capable of being configured.

10. The computer-implemented method of claim 8, wherein:

the booting process comprises loading operating system components into random-access memory (RAM) of the at least one computing device;

the boot loading environment is a Unified Extensible Firmware Interface (UEFI) boot loading environment; and the computer-implemented method further comprises installing the application programming interface by storing a driver in a directory that directs the UEFI boot loading environment to install the driver during the power-on stage of the booting of the at least one computing device.

11. The computer-implemented method of claim 8, the boot loading environment is a Unified Extensible Firmware Interface (UEFI) boot loading environment.

12. The computer-implemented method of claim 8, wherein the first stage boot loader is a UEFI applicable executed in the UEFI boot loading environment.

13. The computer-implemented method of claim 8, wherein:

the at least one computing device is at least one smart network interface card (smartNIC); and the computer-implemented method is performed via execution of program instructions are at least a portion of firmware of the at least one computing device stored in non-volatile memory.

14. The computer-implemented method of claim 8, wherein:

the hardware-implemented watchdog is configured to send a reset signal when a first predetermined amount of time elapses without receipt of a first refresh signal;

the reset signal directs the at least one computing device to enter into a safe mode or perform a device reset; and the hardware-implemented watchdog is initialized using a second predetermined amount of time, the second predetermined amount of time being greater than the first predetermined amount of time.

15. A non-transitory computer-readable medium having program instructions stored thereon executable by at least one computing device having at least one hardware processor that, when executed by the at least one computing device, direct the at least one computing device to:

during a power-on stage of a booting process for the at least one computing device, direct a boot loading environment to install an application programming interface (API) able to be invoked to control operation of a hardware-implemented watchdog;

during an operating system loading stage of the booting process, invoke the application programming interface to enable the hardware-implemented watchdog, wherein the hardware-implemented watchdog is configured to send a reset signal when a first predetermined amount of time elapses without receipt of a first refresh signal, the reset signal directs the at least one computing device to enter into a safe mode or perform a device reset, and the hardware-implemented watchdog is initialized using a second predetermined amount of time, the second predetermined amount of time being greater than the first predetermined amount of time; and during an operating system hand-off stage of the booting process, perform a last watchdog refresh of the hardware-implemented watchdog and hand off execution of the boot loading environment to a kernel boot loader of an operating system, wherein the application programming interface is not accessible after the hand off to the kernel boot loader.

16. The non-transitory computer-readable medium of claim 15, wherein the at least one computing device is further directed to:

invoke the application programming interface through an application programming interface call to perform at least one of: enable the hardware-implemented watchdog; disable the hardware-implemented watchdog; access a type of the hardware-implemented watchdog; access a physical memory address for the hardware-implemented watchdog; identify a minimum countdown period in which the hardware-implemented watchdog is capable of being configured; and identify a maximum countdown period in which the hardware-implemented watchdog is capable of being configured.

17. The non-transitory computer-readable medium of claim 15, wherein:

the booting process comprises loading operating system components into random-access memory (RAM) of the at least one computing device;

the boot loading environment is a Unified Extensible Firmware Interface (UEFI) boot loading environment; and the application programming interface is installed by storing a driver in a directory that directs the UEFI boot loading environment to install the driver during the power-on stage of the booting of the at least one computing device.

18. The non-transitory computer-readable medium of claim 15, wherein:

the application programming interface comprises a first portion code configured to control operation of the hardware-implemented watchdog based on a type of the at least one computing device;

the application programming interface comprises a second portion code configured to control operation of another hardware-implemented watchdog based on other types of computing devices;

the first portion of code and the second portion of code are included in a single image of a bare-metal hypervisor executable on the at least one computing device;

the at least one computing device is at least one smart network interface card (smartNIC); and the program instructions are at least a portion of firmware of the at least one computing device stored in non-volatile memory.

19. The non-transitory computer-readable medium of claim 15, wherein the at least one computing device is further directed to execute a first stage boot loader, the first stage boot loader being a UEFI applicable executed in the UEFI boot loading environment; wherein the first stage boot loader invokes the application programming interface to enable the hardware-implemented watchdog.

20. The non-transitory computer-readable medium of claim 15, wherein the application programming interface is installed by storing a driver in a directory that directs the boot loading environment to install the driver during the power-on stage of the booting of the at least one computing device.

* * * * *